United States Patent [19]

Watanabe

[11] Patent Number: 4,986,859
[45] Date of Patent: Jan. 22, 1991

[54] METHOD AND A DEVICE TO PASTE A STRIP TAPE ONTO A PACKAGING WEB EQUIPPED WITH A LIQUID POURING HOLE

[75] Inventor: Masashi Watanabe, Yokohama, Japan

[73] Assignee: AB Tetra Pak, Lund, Sweden

[21] Appl. No.: 432,060

[22] Filed: Nov. 6, 1989

[30] Foreign Application Priority Data

Nov. 7, 1988 [JP] Japan .................. 63-280876

[51] Int. Cl.$^5$ ............................................ B32B 31/12
[52] U.S. Cl. .................................. 156/69; 156/274.4; 156/497; 156/499; 156/DIG. 38; 220/270; 220/359; 493/103
[58] Field of Search .................. 53/329, 428; 156/69, 156/274.4, 497, 499, DIG. 38; 220/270, 359; 493/103

[56] References Cited

U.S. PATENT DOCUMENTS

| | | | |
|---|---|---|---|
| 3,329,550 | 7/1967 | Kucheck | 156/DIG. 38 X |
| 4,585,498 | 4/1986 | Lagerstedt et al. | 156/69 |
| 4,612,076 | 9/1986 | Moss | 156/497 X |

Primary Examiner—Robert A. Dawson
Attorney, Agent, or Firm—Koda and Androlia

[57] ABSTRACT

A method and device to attach a strip tape onto a packaging web having a liquid-pouring hole by a heating element, which is provided with heating coils and an air hole, and a pressure rail which has a tape escape, so that when the strip tape is heat sealed on the packaging web, air is blown to a part of the strip tape covering the liquid-pouring hole so as to loosen such part into the tape escape.

4 Claims, 4 Drawing Sheets

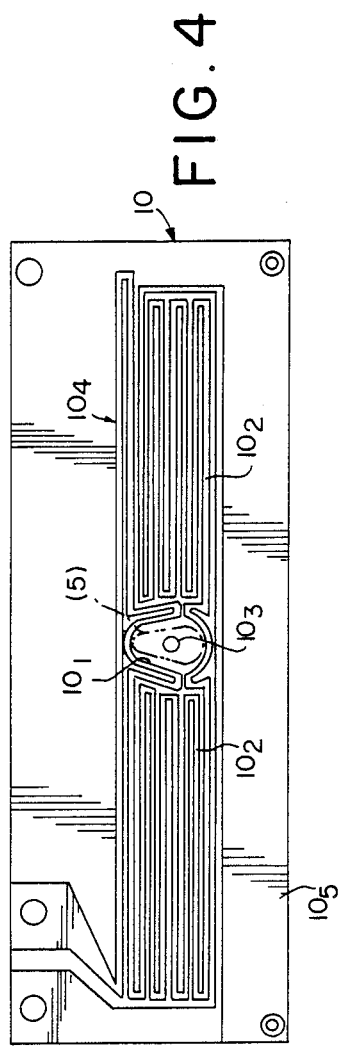
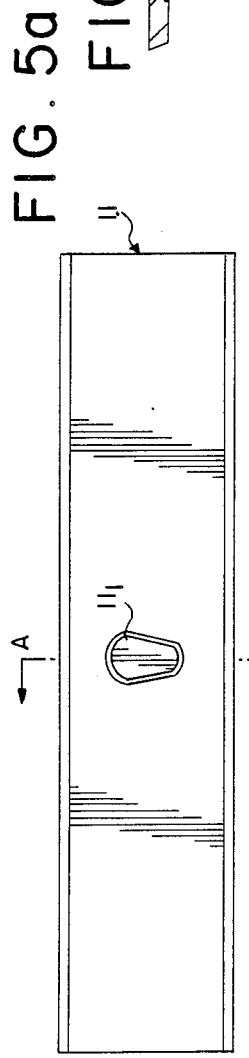
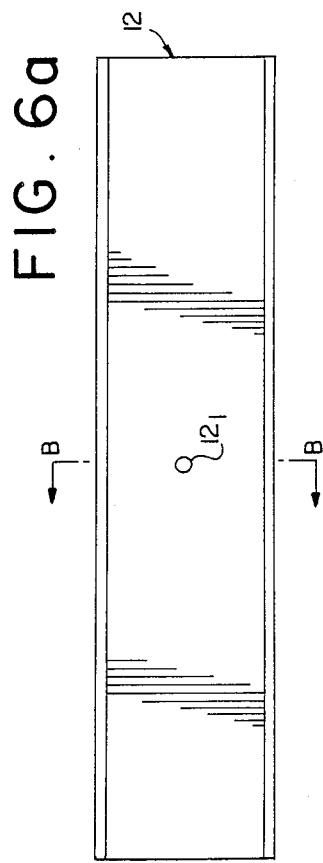

METHOD AND A DEVICE TO PASTE A STRIP TAPE ONTO A PACKAGING WEB EQUIPPED WITH A LIQUID POURING HOLE

BACKGROUND OF THE INVENTION

1. Field of the Invention

The present invention relates to a method and device for attaching a strip tape to a packaging web so as to close a liquid pouring hole formed in the web.

2. Prior Art

Currently, a paper container called a pack container for a liquid product such as milk, juice etc. as shown in FIG. 10 is used. In order to easily pour juice or milk from this kind of pack container P, an opening device is provided such that a liquid-pouring punch hole 5 is previously formed on the container top plane and its inner plane is sealed with a strip tape 2 to make the container liquid-tight, and a pull-tab 7a is heat-sealed from outside so that the liquid pouring hole 5 is easily opened by peeling off the pull-tab 7a together with the strip tape 2.

Conventionally, in mounting this kind of opening device onto a container, the opening device is formed at a prescribed position on the packaging web, and the packaging web is folded to make the container into which liquid food is filled. As shown in FIG. 1, the packaging web 1 usually consists of a paper material $1_1$, which is a supporting material layer, on one surface of which is fixed a metallic foil layer $1_2$ such as aluminum foil, and the surface of the metallic foil layer $1_2$ and another surface of the paper $1_1$ are laminated with a polyethylene layer $1_3$ (Note, in the figure, the web is drawn to appear thicker to make it easier to see.)

In forming an opening device for such a packaging web 1, when sealing the liquid-pouring punch hole 5 with a resin strip tape 2, the strip tape 2 is placed over a prescribed position on the packaging web, heated and deposited by a heat coil for high-frequency induction heating onto the surface of the packaging web 1 (refer to FIG. 7) in which punch holes 5 are intermittently and successively formed after each prescribed interval 1. This high-frequency induction heating coil is a quasi-rectangular print coil $10_4$ of a prescribed length (corresponding to the intermittent conveyance distance for the packaging web) on a flat plate having an open coil part $10_1$ that surrounds a punch hole 5 in the center, as shown in the example in FIG. 4 (except the central hole $10_3$). A rectangularly formed coil part $10_2$ is formed on both sides of the open coil part $10_1$. Between the high-frequency induction heating coil 10 and the pressure rail 11, the strip tape 2 is pressed onto the packaging web 1 and the metallic foil layer $1_2$ adjacent to the tape is heated by a high-frequency wave to deposit the tape onto the web. When heating and depositing the tape onto the web plane, the punch hole 5 of the packaging web 1 is positioned inside the open coil part $10_1$ in the center of the quasi-rectangular print coil $10_4$ on the high-frequency induction heating coil 10. After the strip tape 2 closes the punch hole 5 on the polyethylene-laminated layer $1_3$ surface on the metallic foil layer $1_2$ side of the packaging web 1 and is deposited with a prescribed margin for longitudinally sealing the web (see FIG. 8), a pull-tab 7a of a prescribed length closes the punch hole 5 on the polyethylene-laminated layer $1_3$ surface of the paper material $1_1$ on the back of the deposited part, and are heat sealed together with the strip tape 2 onto the packaging web 1 to form the opening device (see FIG. 9).

When the strip tape 2 is pressed onto a packaging web 1 to close a punch hole 5 and deposited by high-frequency induction heating between the high-frequency induction heating coil 10 and the pressure rail 11, there is no metallic foil layer $1_2$ or polyethylene-laminated layer $1_3$ inside the edge of a punch hole 5. When the coil part $10_1$ which surrounds the central punch hole 5 of the spring coil part $10_3$ heats the edge of the punch hole 5 of the metallic foil layer $1_2$, the edge of the laminated layer $1_3$ and the strip tape 2 contacts the part that is heated to a half-melted condition. A part of the strip tape 2, that is positioned between the unheated portion, which is inside the unheated punch hole 5, and the heated portion, becomes thin, resulting in pinholes easily forming inside the strip tape, thus causing leakage and spoilage of the contents. Furthermore, the edge of the punch hole is subject to an intense load, and this, together with heating of the edge of the punch hole of the strip tape, tends to result in poor strength at the joint at the edge of the punch hole.

SUMMARY OF THE INVENTION

The present invention was conceived to solve the above problems, and the object is to provide an improved method and device to attach a strip tape onto the packaging web by sealing a punch hole, which is to become the liquid-pouring hole of the web, with a synthetic resin strip tape so that generation of pin holes is prevented, and leakage and spoilage of the contents are prevented and also the joint between the strip tape and the web at the edge of the punch hole is prevented from weakening.

In order to achieve the above object, the present invention utilizes a method in which a strip tape is pasted onto a packaging web by a heating element and a pressure rail which are set over and below the conveyance path of the packaging web by pressing a strip tape onto the packaging web and closing a previously made punch hole. In the method of the present invention, air is blown to the area of the strip tape which covers the punch hole 5 so that the strip tape is loosened at this area and deposited onto the packaging web.

To implement this method, an air hole is provided inside an encompassing heating part which is formed so as to surround the punch hole of an intermittently conveyed packaging web on the flat heating element set on one side of the conveyance path of the packaging web. On the pressure rail on the opposite side, a tape escape is provided on the opposite side of the circular heating part so that the strip tape blown by air enters thereinto. When the strip tape is pasted onto the web, air is blown through an air hole of the induction heating coil.

As for the heating element, when the packaging web consists of a metallic foil layer, it is preferable to use a high-frequency induction heating coil 10 made of a print coil formed on an insulated plate. In this case, it is preferable to use a heating element in which rectangular coil parts are formed around the circular heating part which surrounds the punch hole, and an air hole is provided in the center of the circular heating part.

When closing the punch hole of the packaging web with a strip tape by pasting the strip tape onto the web using the above described method, the part of the strip tape that covers the punch hole of the web becomes loose when the air is blown to that part. Because of this looseness of the tape inside the punch hole, the border between the part of the strip tape inside the unheated punch hole and the part of the strip tape heated and half-melted around the punch hole edge does not become thin; therefore, generation of pinholes and weakening of the joint are prevented.

When air is blown from an air hole (which is inside the circular heating part of the heating element in the center of the high-frequency induction heating coil) to the strip tape which closes the punch hole, the strip tape at the closed part (or which covers the punch hole) can be easily loosened in the tape escape formed on the pressure rail so that the tape can be deposited (attached) to the web while it is being loosened, and generation of pinholes can be prevented.

BRIEF DESCRIPTION OF THE DRAWINGS

FIG. 4 is a plan view of the high-frequency induction heating coil used as the heating element;

FIG. 5($a$) is a plan view of the pressure rail;

FIG. 5($b$) is a sectional view taken along line A—A of FIG. 5($a$);

FIG. 6($a$) is a plan view of the backplate;

FIG. 6($b$) is a sectional view taken along line B—B of FIG. 6($b$);

DETAILED DESCRIPTION OF THE INVENTION

Embodiments of the present invention shall now be described with reference to the accompanying drawings.

Figure 1:
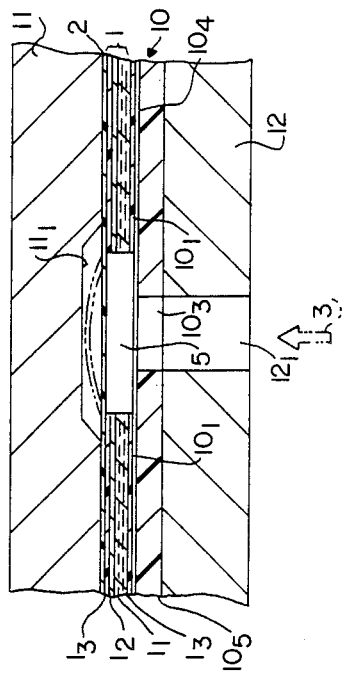
FIG. 1 is an enlarged sectional view of an open punch hole in a packaging web having metallic foil layer and the strip tape covering the punch hole in accordance with the present invention.

FIG. 1 is an enlarged view showing a part of a packaging web having a metallic foil layer and a strip tape attached or pasted thereon using the method of the present invention. Shown therein is a joint between the packaging web having the punch hole and the strip tape covering the hole. The strip tape pasting device is used to form an opening in a packaging container and is provided before the liquid food filling section in the packaging machine.

Figure 2:
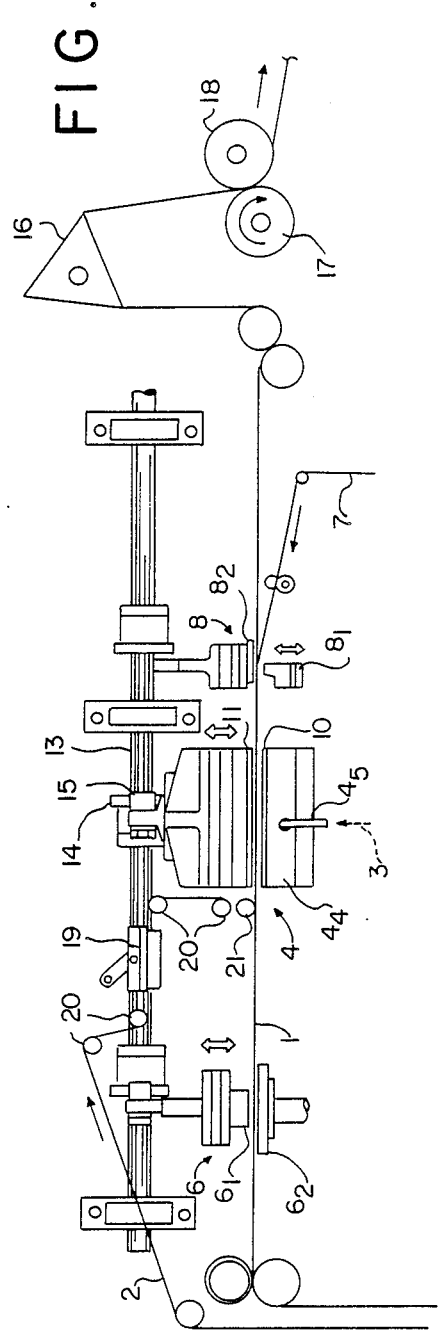
FIG. 2 is a schematic front view of an apparatus for making the packaging container of the present invention.
Figure 7:
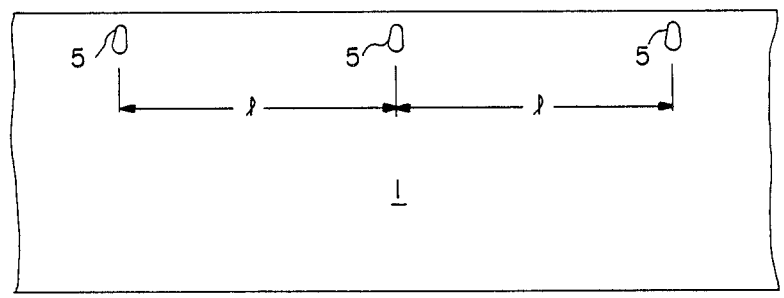
FIG. 7 is a plan view showing the packaging web with a punch hole.
Figure 8:
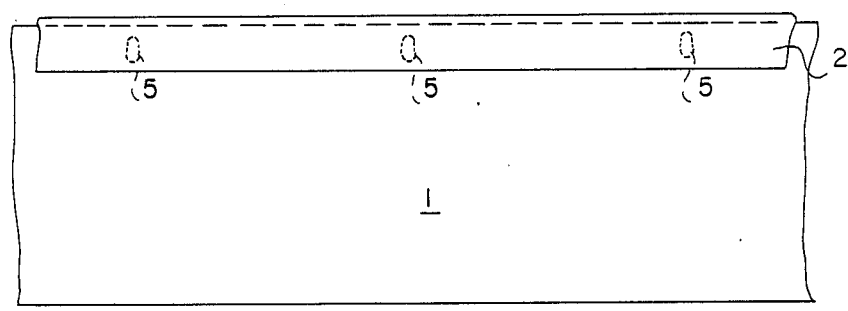
FIG. 8 is a plan view showing the packaging web with its punch hole sealed with a strip tape.
Figure 9:
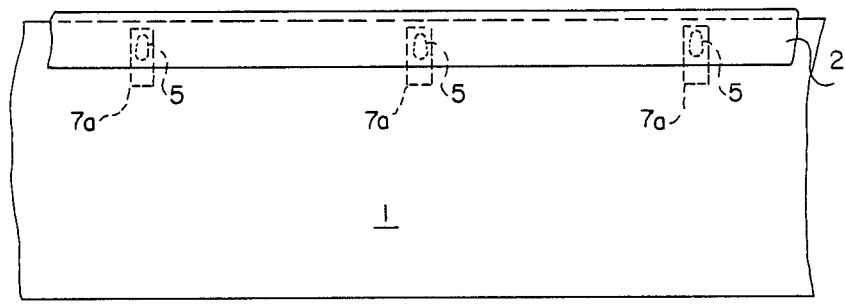
FIG. 9 is a plan view showing the packaging web with a pull-tab attached.

FIG. 2 schematically shows an opening part formation device, in which a packaging web 1 is processed by passing therethrough, and punch holes 5 are formed one after another with an interval of one between them as shown in FIG. 7, FIG. 8, and FIG. 9. The punch hole 5 is sealed by a strip tape 2, and the pull tab $7a$ is pasted by heat sealing so as to close the punch hole 5 on the side opposite the strip tape 2 of the packaging web 1 to form a pull-tab opening device in a precontainer condition.

More specifically, the packaging web 1 is intermittently conveyed upward by a drive roller 17 (to be described later) from a packaging web reel (not shown) provided in the lower left hand side of FIG. 2. The direction that the packaging web 1 is conveyed in is changed horizontally by direction-altering rollers, and while the packaging web 1 is intermittently conveyed between a vertically moving punch $6_1$ and a fixed die $6_2$ of the piercing device 6, the punch holes 5 are made. At the strip tape pasting device 4, the punch holes are sealed by putting the upper surface of the packaging web 1 and strip tape 2 together between a flat high-frequency induction heating coil 10 and a pressure rail 11.

Figure 10:
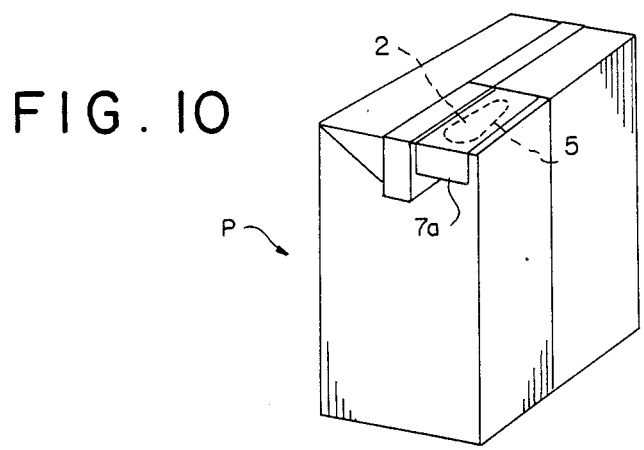
FIG. 10 is a diagonal view of the packaging container with a pull-tab opening device.

Next, at the pull-tab pasting device 8, a pull-tab opening device is formed on the packaging web 1 by heat sealing the bottom surface of the packaging web 1 so as to cover the punched hole with a pull-tab $7a$ which is cut out of the pull-tab tape 7. This is done between a heating body 8, which is under the path of the packaging web 1 and is equipped with a pull-tab tape cutting device, and a counter rail $8_2$ positioned above the path of the packaging web 1. The packaging web 1 with such an opening device attached goes through a pair of direction-altering rollers provided downstream. Then, after the folding lines (previously formed on the packaging web 1) are aligned by the folding wheel 16 which has corners on the perimeter, the packaging web 1 is intermittently conveyed by the force between the lower drive roller 17, which is intermittently rotated by a drive motor (not shown) and the counter roller 18. After that, conveyance of the packaging web 1 is controlled by freely and vertically moving dancing-rollers of a conveyance control magazine (not shown), and the packaging web 1 moves toward the filling section. The thus formed package is filled with a liquid product, sealed and cut so that package containers with pull-tab opening devices P as shown in FIG. 10 are continuously manufactured.

Figure 3:
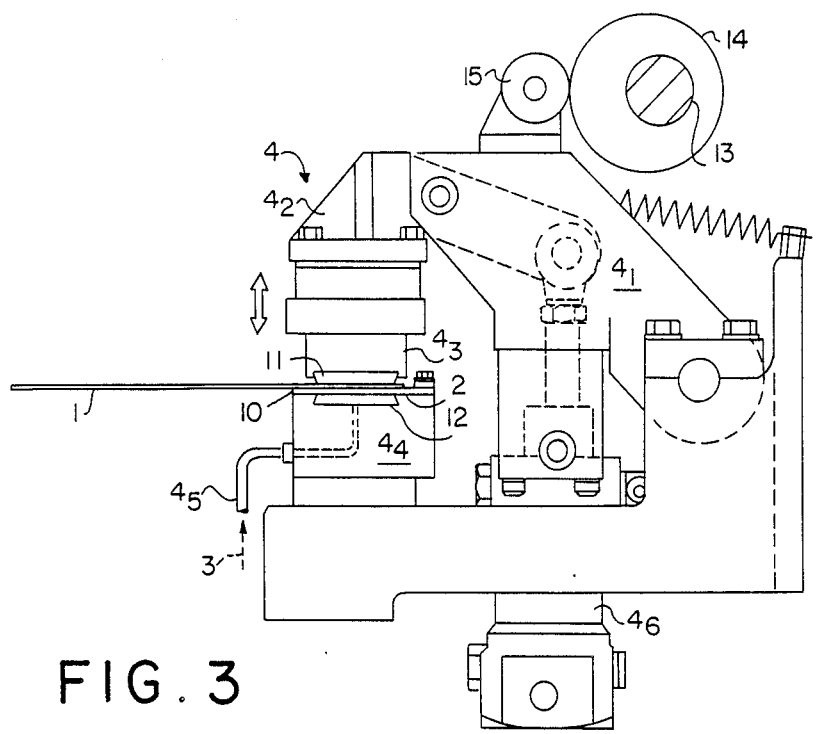
FIG. 3 is a side view of the strip tape pasting device using the method of the present invention.

The strip tape pasting device 4 has, below the packaging web 1 conveyance path, a flat high-frequency induction heating coil 10 mounted on a backplate 12 in the upper part of the mount $4_4$; and above the path, the tape pasting device 4 has a pressure rail 11 mounted in the bottom of the vertically moving counter jaw $4_3$. The counter jaw $4_3$ is pivoted at the tip of a lever $4_1$ with a cam roller 15 driven by a cam 14 (see FIGS. 2 and 3) mounted by a main shaft 13. The counter jaw $4_3$ is positioned at the bottom of a top end part $4_2$ connected to an air cylinder $4_6$ mounted on the lever $4_1$. Thus, the counter jaw $4_3$ moves up and down in a prescribed manner when the main shaft 8 rotates.

When the counter jaw $4_3$ moves up and down, the strip tape 2, which is guided by direction-altering rollers and guide rollers and braked by a braking means 19, is overlaid on the surface of the web 1 at the pressure roller 21 just before the pasting device 4 in such a manner that an edge of the tape 2 extends beyond an edge of the packaging web 1 to cover the punch hole 5. After being pressed by the pressure rail 11 on the high-frequency induction heating coil 10 and the pressure part heated by the high frequency induction, the tape 2 is deposited at a prescribed position on the packaging web 1.

The high frequency induction heating coil 10 is a rectangular synthetic resin insulated plate $10_5$ with a print coil $10_4$ fixed on it, as shown in FIG. 4. The print coil $10_4$ has an encompassing coil $10_1$ in the center so that it surrounds the punch hole 5 of the packaging web 1 which is intermittently conveyed and stopped on the conveyance line. A blow-out hole $10_3$ is opened in the center of the encompassing coil $10_1$. On the left and right sides of the encompassing coil $10_1$, rectangular coil parts $10_2$ of a prescribed width and having bent parts on both sides in the longitudinal direction, are provided so that the coil parts $10_2$ extend over the distance of the intermittently conveyed distance of the packaging web 1.

The pressure rail 11 provided opposite to the high-frequency induction heating coil 10 is rectangular shape and of prescribed dimensions with its edges on the longer sides tapered so that it can be mounted on the counter jaw $4_3$. A tape escape $11_1$, into which the strip tape 2 loosened by the air enters, is formed at a prescribed depth so as to face the encompassing coil $10_1$ in the center (see FIG. 5(b)). The backplate 12 for the high-frequency induction heating coil 10 is mounted on the mount $4_4$ so as to contact the coil 10. The backplate 12 has the same exterior dimensions as the pressure rail 11 shown in FIG. 6 (a); and at its center it has an air blow hole $12_1$ that connects with the air hole $10_3$ when the high-frequency induction heating coil 10 is mounted to the mount $4_4$. Air supply tube $4_5$ connected to an air pump (not shown) is brought into the mount $4_4$ from the front (see FIGS. 2 and 3), so that air 3 is blown from an air path which penetrates the mount $4_4$ to a part of the strip tape 2 that covers the punch hole 5 of the packaging web 1 through the air hole $12_1$ of the backplate 12 and an air blow-out hole $10_3$ of the high-frequency induction heating coil 10.

Accordingly, when pasting the strip tape 2 onto the upper surface of the packaging web 1, the part of the strip tape 2 that covers and closes the punch hole 5 of the packaging web 1 is heated and deposited on the circumferential edge of the punch hole 5 in a loosened condition caused by air 3 blown from the below as shown by the chain line in FIG. 1. Therefore, the thickness of the part of the strip tape positioned between the tape inside the punch hole 5 and the circumferential edge is prevented from becoming thin due to partial melting, and the generation of pinholes is prevented. At the same time, the strength at the joint between the web and strip tape can be maintained. For this reason, when pasting the pull-tab 7a onto the surface of the packaging web 1 on the other side of the strip tape 2, the heating condition at the time the pull-tab is pasted can be reduced, and therefore the pull-tab can be pasted onto the strip tape in a stable condition.

In the above described embodiment, a metallic foil layered web is used as the packaging web, and a high-frequency induction heating coil is used as a heating element, but as anyone trained in the art will know, the embodiment is not restricted to these materials. Even if a web without a metallic foil layer and a heating element using ordinary electric heater are used, heating and depositing can be done in the same manner.

As is obvious from the above description, the present invention has the following effects:

In the method of the present invention the part of the strip tape that closes the punch hole is first loosened by air and then deposited keeping that condition. As a result, the generation of pinholes in the strip tape and the leakage and spoilage of the contents are prevented. In addition, with more relaxed heating conditions at the time of pull-tab pasting, pasting between the strip tape and the pull-tab is stable and secure, contributing to good operability of the pull-tab.

Furthermore, the heating element and the pressure rail are provided on and below the conveyance path of the packaging web, respectively, the heating element has an air hole provided in the center of the circular heating part so as to surround the punch hole, and the pressure rail opposing the heating element has a strip tape escape formed opposite the circular heating part. Accordingly, the strip tape can be formed loosely and in this way pasting of the strip tape to the web can be performed more efficiently and smoothly; thus, the device can paste the strip tape on the web in a stable manner without generating pinholes.

In addition, a high-frequency induction heating coil is used as a heating element and the circular heating part is formed in the center thereof; therefore when the strip tape is pasted to a packaging web having a metallic foil layer, the deposition of the strip tape onto the web is easily controlled.

I claim:

1. A method to paste a strip tape onto a packaging web equipped with a liquid pouring hole in which a strip tape is pasted onto a packaging web between a flat heating element and a freely pressible pressure rail provided over and below a conveyance path of a packaging web conveyed intermittently, by pressing said strip tape onto said packaging web and closing a previously made punch hole, wherein air is blown in a direction opposite to a direction in which said strip tape is adhered to an area of said strip tape that closes said punch hole by overlapping on the packaging web surface, so that said strip tape at said area is loosened and deposited onto the packaging web when said strip tape is being pasted to said web.

2. A device to paste a strip tape onto a packaging web equipped with a liquid-pouring hole in which a flat heating element and a freely pressible pressure rail are set in opposition over and below a conveyance path of an intermittently conveyed packaging web, and a strip tape is pasted onto said web to close a punch hole previously provided thereon for liquid pouring, wherein an air hole is provided within an encompassing heater which is formed so as to surround said punch hole of said intermittently conveyed and stopped packaging web in said heating element, and an escape for said strip tape is formed on said pressure fail so as to face said encompassing heater, so that at the time of pasting said strip tape onto said web, air is blown out o said air hole of said heating element in a direction opposite to a direction in which said strip tape is adhered to loosen said strip tape when said strip tape is being pasted to said web.

3. A device to paste a strip tape according to claim 2 in which said heating element is a high frequency induction heating coil formed of a print coil on an insulated plate wherein said print coil is a rectangularly formed around an encompassing heater and an air hole is provided in the center of said encompassing heater.

4. A device to attach a strip tape onto a packaging web equipped with a liquid-pouring hole by a heating element, which is provided with heating coils comprising an encompassing coil at the center and rectangular coils on both sides thereof, and a pressure rail so that said strip tape is heat sealed on said packaging web to cover said liquid-pouring hole, wherein the improvement comprises an air hole formed within said encompassing coil so as to surround said liquid-pouring hole of said packaging web and said pressure rail is provided with a tape escape so that air is blown out of said air hole in a direction opposite to a direction in which said strip tape is adhered onto a part of said strip tape which covers said liquid-pouring hole so as to loosen said part of said tape into said tape escape of said pressure rail when said strip tape is being pasted to said web.

* * * * *